Feb. 15, 1955     C. E. TACK     2,702,102
BRAKEHEAD ASSEMBLY
Filed March 13, 1952
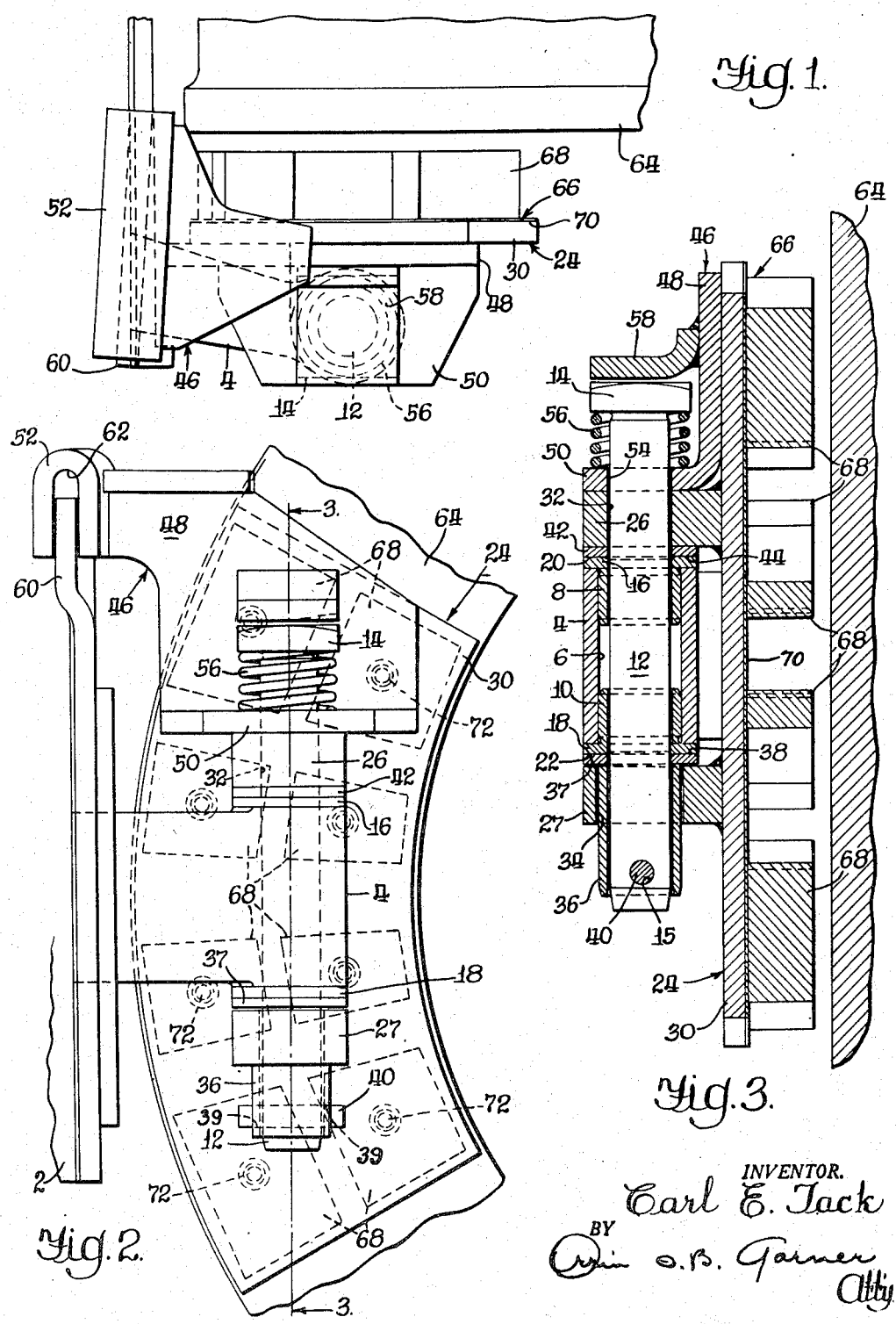
INVENTOR.
Carl E. Tack
BY
Orin O. B. Garner
Atty

United States Patent Office 2,702,102
Patented Feb. 15, 1955

2,702,102

BRAKEHEAD ASSEMBLY

Carl E. Tack, Chicago, Ill., assignor to American Steel Foundries, Chicago, Ill., a corporation of New Jersey Application March 13, 1952, Serial No. 276,370

4 Claims. (Cl. 188—206)

This invention relates to railway brake equipment and is more particularly concerned with the provision of an off-wheel brake arrangement embodying braking means for decelerating one or more disks or rotors associated with a wheel and axle assembly of a railway car truck, as shown and described in my copending application, Serial No. 104,453, filed July 13, 1949, now Patent No. 2,661,818, issued December 8, 1953, and an application Serial No. 211,515, filed February 17, 1951, in the name of William J. Casey, now Patent No. 2,690,237.

Briefly, the present invention comprises a brake arrangement in which a brake disk or rotor is frictionally engaged between a pair of brake shoes secured to brake heads mounted upon brake levers. To insure uniform wear and full face frictional engagement of the brake shoes with the rotor, each brake head is pivotally mounted on the end of its respective lever and guided toward and away from the rotor by means of a guide member mounted on the head for sliding movement along a guide tongue provided on the housing of a mechanism employed to actuate the levers.

During movement of railway cars provided with this type of brake equipment, it will be appreciated that relative movements of the several parts of the brake equipment responsive to vibration, etc. results in noise and wear of parts tending to shorten their service life. It is therefore, an object of the present invention to provide a brake head assembly in which the brake head is frictionally restrained against movement relative to the brake lever except during operation of the brake mechanism in moving the shoe relative to the rotor.

This invention further contemplates the provision of an improved pivotal connection between the brake head and brake lever in which thrust bearing surfaces provided at opposite sides of the lever are urged into tight frictional engagement by means of a helical compression spring sleeved over one end of the pivot pin.

This invention embodies other novel features, details of construction and arrangement of parts which are hereinafter set forth in the specification and claims and illustrated in the accompanying drawing, wherein:

Figure 1 is a top plan view illustrating a brake head assembly embodying features of the present invention.

Figure 2 is a side elevational view of same.

Figure 3 is a sectional view taken along the line 3—3 of Figure 2.

Referring now to the drawing for a better understanding of the present invention, the brake head assembly is shown as applied to a brake arrangement comprising a housing 2 adapted to be supported upon the frame of a railway car truck to enclose a double acting cartridge type cylinder (not shown) which may be of the type disclosed in patent to Tack, No. 2,355,122 in which fluid under pressure is introduced into the cylinder to actuate a pair of pistons engaging the inner ends of brake levers pivotally mounted intermediate their ends on the housing.

The brake head assembly is shown as comprising a brake lever 4 formed at its outer end with a cylindrical bore 6 having upper and lower bearing bushings 8 and 10 press-fitted into opposite ends thereof to receive a pivot pin 12 formed with a square head 14 and a pin aperture 15. The bushings 8 and 10 are formed with relatively large diameter annular flanges 16 and 18, respectively, having flat bearing faces 20 and 22 disposed in planes normal to the axis of the bore 6.

A brake head 24 is mounted for pivotal movement on the outer end of the brake lever 4 by means of the pivot pin 12 and is shown as comprising a pair of spaced lugs 26 and 27 welded to a flat plate 30. The upper lug 26 is bored at 32 to slidably receive the pivot pin, and the lower lug 27 is bored at 34 to slidably receive a thrust bushing 36 formed with a relatively large diameter flange 37 having a flat face 38 frictionally engaging the complementary flat face 22 on the bushing 10. The thrust bushing 36 is formed with coaxial apertures 39—39 in registry with the pivot pin aperture 15 to receive a suitable locking pin such as a conventional roll pin 40. A thrust washer 42, sleeved over the pivot pin 12 between the lug 26 and bushing 8, is formed with a flat face 44 for engagement against the flat face 20 of the bushing.

The brake head 24 is provided with a guide member indicated generally at 46 and shown as comprising a body portion 48 having a flange 50 on its lower end and an inverted U-shape portion 52 on its upper end, the flange being formed with an aperture 54 to loosely receive the pivot pin 12 and being pressed into engagement against the upper side of the lug 26 by a helical compression spring 56 provided on the pivot pin. As illustrated in Figure 2, the body portion 48 of the guide member is disposed in flush engagement against the back face of the brake head 24 for common pivotal movement therewith about the axis of the pivot pin and has an abutment lug 58 welded thereto above the head 14 of the pin.

The housing 2 is provided with a guide tongue 60 for sliding engagement within the recess 62 defined in the U-shape portion 52, the tongue being disposed at an angle to the axis of rotation of a rotor 64 keyed to a wheel and axle assembly (not shown). During pivotal movement of the brake lever 4, the guide member 46 and guide tongue 60 coact to direct and maintain the brake head 24 in proper position relative to the plane of the rotor. The brake head guide means disclosed herein is described and claimed in application Serial No. 211,515, heretofore mentioned.

The brake head 24 is provided with a brake shoe indicated generally at 66 and shown as comprising a plurality of blocks of suitable friction material 68 bonded to a relatively thin sheet metal backing plate 70 having a contour corresponding to the contour of the brake head and secured thereto by rivets 72. The brake shoe herein shown and described is disclosed in a copending application Serial No. 274,196, filed February 29, 1952, in the names of Bachman et al.

After a brake shoe of the type shown and described has become worn out, it is discarded and replaced by a new shoe. To replace a worn brake shoe, the brake head is removed from the brake lever by first removing the pin 40 and then removing the pivot pin 12 and guide member 46 from the assembly. After the parts have been thus disassembled, it will be noted that the spring 56 and the head 14 of the pivot pin are engaged between the flange 50 and lug 58 on the guide member 46, with the shank of the pin disclosed in the aperture 54, to facilitate reassembly of the brake head on the brake lever.

When the several parts have been assembled in the manner shown and described, the spring 56 is compressed and acts to urge the pivot pin 12 upwardly through the aperture 54 in the guide member flange 50, thus causing the thrust bushing 36 to urge the opposing friction faces 22—38 and 20—44 into tight frictional engagement whereby relative movement of the several parts, due to vibration and shock incidental to movements of the truck frame, is restrained. By thus frictionally engaging the several parts against relative movement resulting from movements of the truck frame, the service life of the assembly is extended.

While this invention has been shown in but one form it is obvious to those skilled in the art that it is not so limited but is susceptible of various changes and modifications without departing from the spirit and scope of the claimed invention.

I claim:

1. In a brake head assembly, a brake head having spaced lugs formed with coaxial apertures, a brake lever disposed between said lugs and having a bore in registry with said apertures, flanged bushings press-fitted into opposite ends of said bore, a flanged thrust bushing slidably mounted in the aperture of one of said lugs and engaging one of said bushings, a thrust washer engaged between the other of said bushings and adjacent other lug, a guide member having an apertured flange engaging the side of the other lug remote from said thrust washer, a pivot pin extending through said apertured flange, said other lug, flanged bushings and thrust bushing, said pin having a head spaced from said apertured flange, means to secure said thrust bushing to said pin, and a helical spring on the pin between its head and said apertured flange acting to urge the pin head away from the flange to frictionally engage said flanged bushings between said thrust bushing and thrust washer.

2. In a brake head assembly, a brake head having spaced lugs formed with coaxial apertures, a brake lever disposed between said lugs and having a bore in registry with said apertures, flanged bushings press-fitted into opposite ends of said bore, a flanged thrust bushing slidably mounted in the aperture of one of said lugs and engaging one of said bushings, a thrust washer engaged between the other of said bushings and adjacent other lug, a guide member having an apertured flange engaging the side of the other lug remote from said thrust washer, a pivot pin extending through said apertured flange, said other lug, flanged bushings and thrust bushing, said pin having a head spaced from said apertured flange, means to secure said thrust bushing to said pin, and a helical spring on the pin between its head and said apertured flange acting to urge the pin head away from the flange to frictionally engage said flanged bushings between said thrust bushing and thrust washer, and a stop lug on said guide member disposed to limit axial movement of said pivotal pin head away from said flange.

3. In a brake head assembly, a brake head comprising a flat metal plate having spaced upper and lower lugs fixed thereon and formed with coaxial apertures, a brake lever having an end disposed between said lugs and formed with a bore coaxial with said apertures, a thrust bushing slidably mounted in the aperture in one lug, a pivot pin extending through the other lug aperture, brake lever bore and thrust bushing and secured to the latter, said pin having a head spaced from the top side of the other lug, and a helical compression spring sleeved on said pin engaging one side of the pin head and urging the pin away from the lugs to cause frictional engagement at opposite sides of the brake lever to restrain relative movement between the several parts of the assembly, flanged bushings fitted into opposite ends of said bore, one of said flanged bushings being engaged by said thrust bushing, and the other bushing engaging a thrust washer sleeved over the pivot pin and engaged against one side of the other lug.

4. In a brake head assembly, a brake head comprising a flat metal plate having spaced upper and lower lugs fixed thereon and formed with coaxial apertures, a brake lever having an end disposed between said lugs and formed with a bore coaxial with said apertures, a thrust bushing slidably mounted in the aperture in the lower lug, a pivot pin extending through the upper lug aperture, brake lever bore and thrust bushing and secured to the latter, said pin having a head spaced from the top side of the upper lug, and a helical compression spring on said pin engaging the underside of the pin head and urging the pin upwardly to cause frictional engagement at opposite sides of the brake lever to restrain relative movement between the several parts of the assembly, flanged bushings press-fitted into opposite ends of said bore, one of said flanged bushings being engaged by said thrust bushings, and the other bushing engaging a thrust washer sleeved over the pivot pin and engaged against the bottom side of the upper lug, the outer diameters of the thrust washer and flanges on said bushings being equal in size.

References Cited in the file of this patent

UNITED STATES PATENTS

| | | |
|---|---|---|
| 1,199,869 | Burton | Oct. 3, 1916 |
| 1,619,107 | Enright | Mar. 1, 1927 |
| 2,380,803 | Tack | July 31, 1945 |
| 2,402,386 | Eksergian et al. | June 18, 1946 |
| 2,504,668 | Eksergian | Apr. 18, 1950 |
| 2,650,680 | Coombes et al. | Sept. 1, 1953 |